Oct. 3, 1950  A. J. HORNFECK  2,524,665
TELEMETRIC SYSTEM
Filed Oct. 25, 1947

INVENTOR.
ANTHONY J. HORNFECK
BY
Raymond W. Junkins
ATTORNEY

Patented Oct. 3, 1950

2,524,665

UNITED STATES PATENT OFFICE 2,524,665

TELEMETRIC SYSTEM

Anthony J. Hornfeck, Lyndhurst, Ohio, assignor to Bailey Meter Company, a corporation of Delaware Application October 25, 1947, Serial No. 782,114

10 Claims. (Cl. 318—29)

This invention relates to telemetric systems, and more particularly to systems for transmitting signals in response to a variable and positioning a receiving member by the signals at a remote point to provide an indication or record of the variable.

A preferred form of my invention may include a transmitting mechanism operating to produce a signal varying in response to a variable to be measured, and a receiving mechanism having a balanceable network which is subjected to different unbalancing conditions during intervals of time varying with the signals transmitted. The signal may be transmitted during portions of fixed time intervals to produce a condition tending to unbalance the network in one direction, and means may be provided to produce another condition tending to unbalance the network in the opposite direction during the remainder of the time intervals. If desired, the transmitter may produce different signals during the portions of the time intervals for creating different unbalancing conditions. The unbalancing effect on the network is proportioal to the difference between the products of the unbalancing conditions and the intervals of time during which each is applied. Means responsive to an unbalance of the network may be provided for rebalancing the latter and for positioning suitable indicating or recording means.

An object of my invention is to provide an improved telemetric system. Another object is to provide a telemetric system having improved transmitting and receiving mechanisms. Yet another object is to provide a telemetric system which includes only a pair of wires between a transmitter and a receiver, and which operates to provide an indication or record at the receiver of a variable by the transmission of signals at low voltage over the pair of wires. Other objects will appear in the course of the following description.

In the accompanying drawing there are shown for purposes of illustration, two forms which my invention may assume in practice.

Figure 1:
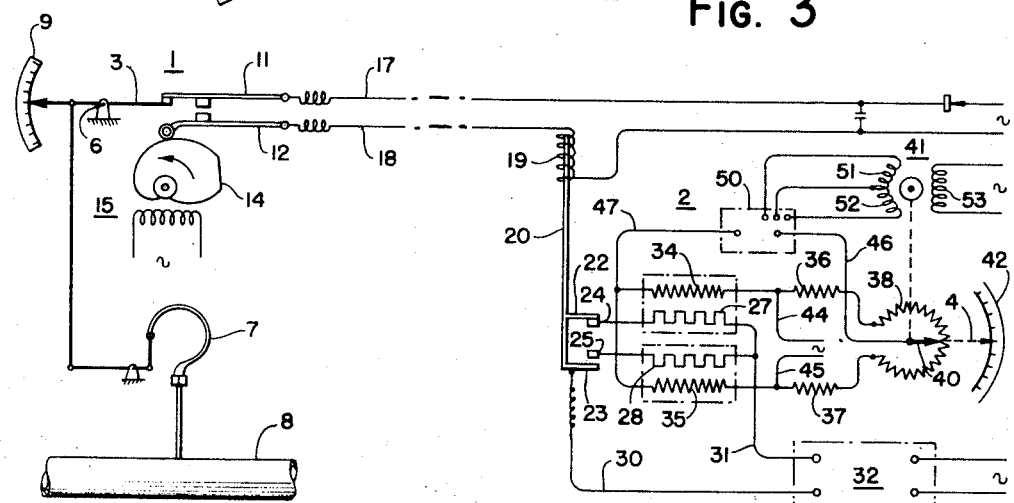
Fig. 1 is a schematic diagram of a telemetric system embodying my invention.

Referring to the drawing, and more particularly to Fig. 1, it will be noted that there is shown a telemetric system including a transmitter 1 and a receiver 2, the transmitter having a movable transmitting member 3, and the receiver having a receiving member 4 which is arranged to be positioned in response to changes in the position of the transmitting member.

The transmitting member 3 is shown herein pivoted at 6 and operatively connected to a device 7, such as a Bourdon tube, responsive to a variable condition, such as the temperature or pressure within a conduit 8. The device 7 could as well be responsive to other variable conditions, such as the flow of fluid, changes in liquid level, etc. A scale 9 cooperates with the transmitting member to provide an indication of changes in the condition, and a pivoted contactor 11 is operatively engaged by the member 3 to be positioned by the latter. A pivoted contactor 12 engages the periphery of a cam 14 and is arranged to be moved by the latter into engagement with the contactor 11. The cam 14 has a substantially uniform rise and is rotated in the direction of the arrow at a constant speed by a motor 15. The contactors 11 and 12 are connected to conductors 17 and 18 leading to a source of alternating current, and connected in the circuit with the conductor 18 at the receiver is a relay winding 19 which controls the position of an armature 20. Contact arms 22 and 23 on the armature are engageable selectively with contacts 24 and 25 for completing circuits through heating elements 27, 28 and conductors 30, 31 energized from a source of alternating current through a constant voltage regulator 32.

At the receiving end of the system is a balanceable bridge network having resistance element 34 and 35 forming one pair of its legs, and resistors 36 and 37 combined with portions of a potentiometer resistance 38 to form the other pair of its legs. A movable contact 40 engages the potentiometer resistance and is operatively connected to a motor 41 to be positioned by the latter for balancing the bridge network. The receiving member 4 is also connected to the motor and is positioned by the latter relative to a scale 42 for indicating the value of the condition measured. Diametrically opposite points of the bridge are connected to a source of alternating current by conductors 44, 45. The movable contact 40 and a point on the bridge between the resistance elements 34, 35 are connected by conductors 46, 47 to an amplifier and control device 50 from which the motor 41 is energized. The motor 41 is shown herein as having opposed pole windings 51, 52 and a field winding 53 connected to a suitable source of alternating current. If the pole winding 51 is short circuited the motor will rotate in one direction, and if the winding 52 is short circuited the motor will rotate in the opposite direction. If both of the windings 51, 52 are short circuited or open circuited, the motor will not rotate in either direction. The amplifier and motor control device may be like tat disclosed in the Ryder Patent 2,333,393 granted November 2, 1943, this device operating on an unbalance of the bridge in one direction to short circuit the pole winding 51, and operating on an unbalance in the opposite direction to short circuit the pole winding 52. The direction of rotation of the motor is such as to move the contact 40 over the potentiometer resistance 38 in a direction to rebalance the bridge. The resistance elements 34, 35 are arranged so as to be heated by the elements 27, 28 respectively, and the resistance of the elements varies in proportion to their changes in temperature.

With the parts in the positions shown in Fig. 1, a circuit is completed through the conductor 30, the contact arm 22, the heating element 27 and the conductor 31. The element 27 then operates to heat the resistance element 34 and tends to produce an unbalance of the bridge. As soon as the cam is rotated from the position shown to a point where it moves contactor 12 into engagement with contactor 11, the relay winding 19 is energized to move the contact arm 22 out of engagement with contact 24 and to move the contact arm 23 into engagement with the contact 25. The circuit through the heating element 27 is then broken, and the circuit through the element 28 is completed to effect a heating of the resistance element 35. If the contactor 11 is positioned by the transmitting member 3 so that the time intervals during which the contactors 11 and 12 are engaged and disengaged, are equal, then the resistance elements 34, 35 will be heated equal amounts during each revolution of the cam and their resistances will be substantially equal. It is true that one of the resistance elements is cooling while the other is being heated, but the cam 14 is rotated at such a speed that the intervals of heating and cooling are comparatively short and the temperature changes during each interval are not sufficient to produce an unbalance of the system. If the condition changes so as to move the member 3 and position the contactor 11 further from the contactor 12, the time intervals during which the contactors 11 and 12 are held closed are reduced while the intervals during which they are held open are correspondingly increased. The heating element 27 will then be energized during longer periods, and the element 28 will be energized during shorter periods. This will result in an increase in the temperature of the resistance element 34 and a decrease in the temperature of the resistance element 35. The resistances of the elements will change in proportion to their changes in temperature and cause the bridge to become unbalanced. This will result in an energizing of the amplifier and motor control device 50 so as to effect operation of the motor to move contact 40 in a direction to rebalance the bridge. The receiving member 4 will be positioned at the same time by the motor 41 to indicate on the scale 42 the value of the condition at the transmitter. If the transmitting member 3 is moved to position the contactor 11 nearer to the contactor 12, the time intervals during which the element 28 is energized are increased and the intervals during which the element 27 is energized are decreased. This results in an unbalance of the bridge in the opposite direction and an operation of the motor 41 to rebalance the system again.

Figure 2:
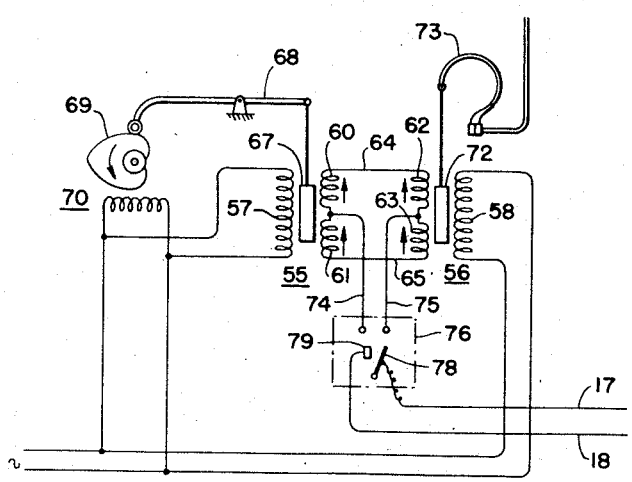
Fig. 2 is a schematic diagram of an improved transmitting mechanism adapted for use in the system of Fig. 1.

In Fig. 2 I have shown another transmitter adapted for use in the system in place of the transmitter of Fig. 1. The transmitter of Fig. 2 includes transformers 55 and 56 having primary windings 57 and 58 connected to a source of alternating current, and aiding secondary windings 60, 61 and 62, 63 connected in a closed loop by conductors 64, 65. A core member 67 is arranged between the primary and secondary windings of the transformer 55 and is connected to one end of a pivoted member 68 which engages at its other end with a cam 69 rotated at a constant speed by a motor 70. The cam 69 is shaped so as to reciprocate the core member 67 at a constant speed between the windings of the transformer. Arranged between the primary and secondary windings of the transformer 56 is a core member 72 which is connected to a device 73, such as a Bourdon tube, responsive to some variable condition. Leading from the closed loop at points between the aiding secondary windings are conductors 74 and 75 connected to a relay 76 like that disclosed in my application, S. N. 633,891, filed December 8, 1945. This relay is of the electronic type and is operative at a very small voltage of a predetermined phase to move a contactor 78 into engagement with a contactor 79 for completing the circuit through the conductors 17 and 18. The core member 72 may be considered as a transmitting member since the closing of contactor 78 to energize the conductors 17, 18 is determined by the position assumed by this member.

When the core members 67 and 72 are in the same positions with respect to the windings of their transformers, the voltages induced in the corresponding secondary windings are equal and opposite so that the voltage across the conductors 74, 75 is zero. If the core members are displaced from each other in one direction, a voltage of a certain phase exists across the conductors 74, 75, and the value of the voltage varies with the amount of displacement. When the core members are displaced in the opposite direction, a voltage opposite in phase to the first voltage exists across the conductors 74, 75. The range of reciprocation of the core member 67 should be adjusted so that its upper and lower limits are equal to or greater than the limits of the core member 72 on maximum changes in the condition to be measured. The range of the core member 67 may be determined by the size of the cam 69 and the location of the pivotal support for the member 68.

Assume that the core members are in the same positions with respect to the windings of their transformers and that the core member 72 remains in this position while the core member 67 is reciprocated. A very slight movement of the core member in one direction will produce a voltage of a phase which operates the relay 76 to close the contactor 78 with the contact 79. While the core member moves in this direction to the end of its stroke and then returns to its initial position, the voltage will continue to be of a phase to operate the relay. As soon as the core member returns to its initial position the voltage across conductors 74, 75 becomes zero and the contactor 78 moves to its open position. A movement of the core member to the other side of its initial position results in a voltage opposite in phase to the first voltage, and the contactor 78 remains in its open position. If the core member 72 is in a position mid-way between the positions it would assume at the opposite limits of the condition measured, and if the core member 67 is reciprocated between corresponding limiting positions, the distances traveled by the core member 67 at opposite sides of the core 72 are equal and result in a holding of the contactor 78 open and closed equal intervals of time. A movement of the core member 72 from its mid-position means that the core member 67 must move an equal amount from such position to reach a point from which it may travel in either direction to produce voltages of different phase. Since the core member 67 will have a greater distance to travel in one direction than the other from its new position, the contactor 78 will be held open or closed longer intervals of time. The resistance elements 34, 35 will then be heated unequal amounts and will cause the bridge to be unbalanced. The amplifier and control device 50 will be energized by the bridge unbalance and effect an operation of the motor 41 to position the contact 40 for rebalancing the bridge. The receiving member 4 will be positioned by the motor at the same time to indicate on the scale 42 the value of the condition measured.

Figure 3:
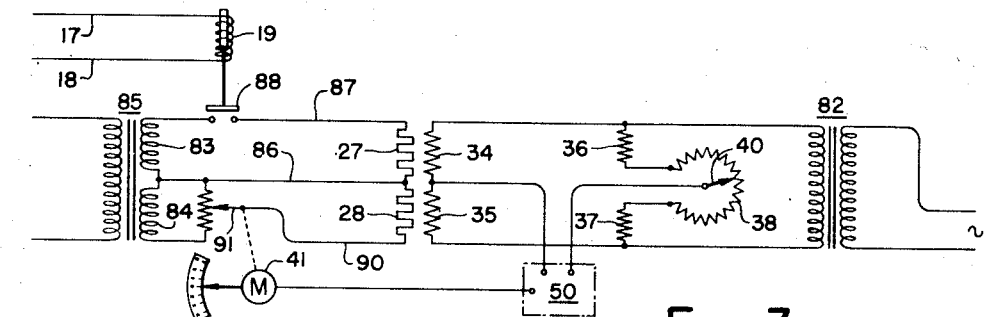
Fig. 3 is a schematic diagram of a receiver adapted for use with the transmitters of Figs. 1 and 2.

In Fig. 3 I have shown another receiver similar to that connected in the system of Fig. 1, but having a different arrangement for controlling the energizing of the heating elements in response to signals received. The receiver includes the resistors 34, 35, 36, 37 and a potentiometer resistance 38 connected in a bridge circuit, as in Fig. 1, and diagonally opposite points of the circuit are connected to the secondary winding of a transformer 82 which has its primary winding energized from a source of alternating current. The contact 40 for the potentiometer resistance is adjustable manually to vary the zero balance of the bridge, but is not moved after adjustment has been made. The amplifier and control device 50 is connected to the contact 40 and to a diagonally opposite point of the bridge for effecting an operation of the motor 41, in one direction or the other in response to bridge unbalance. The heating elements 27 and 28 are energized from secondary windings 83 and 84 of a transformer 85. The adjacent ends of the heating elements are connected by a common conductor 86 to the adjacent ends of the secondary windings 83, 84. The other end of the heating element 27 is connected by a conductor 87 and a contactor 88 to the other end of the secondary winding 83, and the other end of the heating element 28 is connected by a conductor 90 to a movable contact 91 of a potentiometer connected across the secondary winding 84. The contactor 88 is opened and closed in response to signals transmitted through the conductors 17 and 18 to the relay winding 19, and the contact 91 is positioned by the motor 41 along the potentiometer.

It will be noted that the element 27 is subjected to the full voltage of the winding 83 during intervals of time varying with the transmitted signals, and the element 28 is subjected continuously to a portion of the voltage across the winding 84. If these elements heat the resistances 34 and 35 equal amounts, the bridge circuits will be balanced. A change in the transmitted signal will result in a change in the heating of the resistance 34. The bridge will then be unbalanced and effect an operation of the motor to move the contact 91 and vary the heating of the resistance 35 until the bridge is rebalanced.

While there are disclosed in this application several forms which my invention may assume in practice it will be understood that it may be modified and embodied in various other forms without departing from its spirit or the scope of the appended claims.

Certain features of my invention, disclosed but not claimed herein, are disclosed and claimed in my copending divisional application S. N. 157,555 filed April 22, 1950.

What I claim as new and desire to secure by United States Letters Patent is:

1. A telemetric system comprising, in combination, a movable transmitting member, a movable receiving member remotely located from said transmitting member, means for positioning said transmitting member in response to changes in the magnitude of a variable, a balanceable bridge circuit adjacent said receiving member, resistance elements forming legs of said bridge and varying in resistance in response to changes in temperature, an electric heating element for each of said resistance elements, means for intermittently energizing one of said heating elements during time intervals dependent upon the positions of said transmitting member, a reversible motor operatively connected to said receiving member for positioning the latter, means responsive to unbalance conditions of said bridge and operative on unbalance to effect an operation of said motor, and means operatively connected to said motor for rebalancing said bridge.

2. A telemetric system comprising, in combination, a movable transmitting member, a movable receiving member remotely located from said transmitting member, means for positioning said transmitting member in response to changes in the magnitude of a variable, a balanceable bridge circuit adjacent said receiving member, resistance elements forming legs of said bridge and varying in resistance in response to changes in temperature, electric heating elements for said resistance elements, means for energizing one of said heating elements during portions of fixed time intervals, said portions varying with the positions of said transmitting member, means for energizing another of said heating elements at least during the remainder of said time intervals, a reversible motor operatively connected to said receiving member for positioning the latter, means responsive to unbalanced conditions of said bridge and operative on unbalance to effect an operation of said motor, and means operatively connected to said motor for rebalancing said bridge.

3. A telemetric system comprising, in combination, a transmitter including two transformers, each having a primary winding and a pair of aiding secondary windings, means for energizing said primary windings, means for connecting said secondary windings in a closed loop, core members movable between the primary and secondary windings of each of said transformers, means for reciprocating one of said core members in a predetermined path, means for positioning the other of said core members in response to changes in a variable to be measured, a phase sensitive relay connected to said closed loop at points between the secondary windings of each of said transformers, a circuit connected to a source of power and having a contactor controlled by said relay, a receiver including a balanceable bridge network, means operating when said circuit is energized to produce a condition tending to unbalance said bridge in one direction and operating when said circuit is deenergized to produce a condition tending to unbalance said bridge in the opposite direction, a reversible motor, means operative on unbalance of said bridge to effect an operation of said motor, and means operatively connected to said motor for rebalancing said bridge.

4. A telemetric system comprising, in combination, a transmitter including two transformers, each having a primary winding and a pair of aiding secondary windings, means for energizing said primary windings, means for connecting said secondary windings in a closed loop, core members movable between the primary and secondary windings of each of said transformers, means for positioning one of said core members in response to changes in a variable to be measured, means for reciprocating the other of said core members between limiting positions at least as far apart as the limiting positions of said first core member, a circuit connected to a source of power and having a contactor normally assuming an open position, a phase sensitve device connected to said closed loop at diametrically opposite points and operative at a predetermined phase for closing said contactor, a receiver including a balanceable bridge network, means operating when said circuit is energized to produce a condition tending to unbalance said bridge in one direction and operating when said circuit is deenergized to produce a condition tending to unbalance said bridge in the opposite direction, a reversible motor, means operative on an unbalance of said bridge to effect an operation of said motor in a direction depending upon the direction of unbalance, and means positioned by said motor for rebalancing said bridge.

5. A telemetric system comprising, in combination, an electric circuit, means for energizing said circuit intermittently for intervals of time varying with changes in a variable to be measured, a balanceable bridge circuit, means electrically independent of the bridge tending to unbalance said bridge circuit in proportion to the length of the intervals during which said circuit is energized, a reversible motor, means responsive to the balance conditions of said bridge and operative on unbalance to effect an operation of said motor, and means positioned by said motor for rebalancing said bridge.

6. A telemetric system comprising, in combination, an electric circuit, means for energizing said circuit intermittently for intervals of time varying with changes in a variable to be measured, a balanceable bridge circuit, means operative in response to the energizing of said electric circuit for producing a condition tending to unbalance said bridge circuit in one direction, means operative when said electric circuit is deenergized for producing a condition tending to unbalance said bridge circuit in the opposite direction, a reversible motor, means responsive to the balance conditions of said bridge and operative on unbalance to effect an operation of said motor in a direction depending upon the direction of unbalance, and means positioned by said motor for rebalancing said bridge.

7. A telemetric system comprising, in combination, an electric circuit, means for energizing said circuit intermittently for intervals of time varying with changes in a variable to be measured, a balanceable bridge circuit having resistance elements forming two of its legs and varying in resistance in response to changes in temperature, means operative on an energizing of said circuit for heating at least one of said resistance elements and operative at least on a deenergizing of said circuit for heating the other of said resistance elements, a reversible motor, means responsive to the balance conditions of said bridge and operative on unbalance to effect an operation of said motor in a direction depending upon the direction of unbalance, and means positioned by said motor for rebalancing said bridge.

8. A telemetric system comprising, in combination, an electric circuit, means for energizing said circuit intermittently for intervals of time varying with changes in a variable to be measured, a balanceable bridge circuit having resistance elements forming two of its legs and varying in resistance in response to changes in temperature, means connected in said circuit and operative to effect a heating of one of said resistance elements during intervals of time varying with the intervals the circuit is energized, adjustable means for heating the other of said resistance elements, and means operative on an unbalance of said bridge for adjusting said last mentioned means.

9. A telemetric system comprising, in combination, an electric circuit, means for transmitting signals over said circuit varying in response to changes in a condition to be measured, a balanceable bridge circuit having resistance elements forming two of its legs and varying in resistance in response to changes in temperature, heating elements for said resistance elements, means for subjecting one of said heating elements to a predetermined voltage during intervals of time varying with the signals transmitted, means for subjecting the other of said heating elements continuously to a voltage, said last mentioned means including an adjustable member for varying the voltage to which the element is subject, and means operative on unbalance of said bridge for adjusting said adjustable member.

10. A telemetric system comprising, in combination, an electric circuit, means for energizing said circuit intermittently for intervals of time varying with changes in a variable to be measured, a balanceable bridge circuit having resistance elements forming two of its legs and varying in resistance in response to changes in temperature, heating elements for said resistance elements, a circuit for one of said heating elements connected to a source of constant voltage and having a contactor adapted to be closed in response to the energizing of said first mentioned circuit, a circuit for the other of said heating elements and having adjustable means for subjecting it to a variable voltage, and means operative on an unbalance of said bridge for adjusting said adjustable means in a direction to return the bridge to a balanced condition.

ANTHONY J. HORNFECK.

REFERENCES CITED

The following references are of record in the file of this patent:

UNITED STATES PATENTS

| Number | Name | Date |
|---|---|---|
| 1,388,632 | Dean | Aug. 23, 1921 |
| 1,995,594 | Wunsch | Mar. 26, 1935 |
| 2,282,480 | Keeler | May 12, 1942 |
| 2,310,955 | Hornfeck | Feb. 16, 1943 |
| 2,371,415 | Tolson | Mar. 13, 1945 |
| 2,381,009 | Siderman | Aug. 7, 1945 |
| 2,398,341 | Wills | Apr. 9, 1946 |
| 2,400,170 | Silverman | May 14, 1946 |
| 2,403,917 | Gille | July 16, 1946 |
| 2,437,242 | Cole et al. | Mar. 9, 1948 |
| 2,439,891 | Hornfeck | Apr. 20, 1948 |
| 2,440,189 | Zworykin | Apr. 20, 1948 |
| 2,441,226 | Phillips | May 11, 1948 |